US011015521B2

(12) United States Patent
Curlier et al.

(10) Patent No.: US 11,015,521 B2
(45) Date of Patent: May 25, 2021

(54) AIRCRAFT PROPULSION ASSEMBLY EQUIPPED WITH A MAIN FAN AND WITH AT LEAST ONE OFFSET FAN

(71) Applicant: SAFRAN AIRCRAFT ENGINES, Paris (FR)

(72) Inventors: Augustin Marc Michel Curlier, Moissy Cramayel (FR); Adrien Pierre Jean Pertat, Moissy Cramayel (FR); Pierre-Alain Jean Philippe Reigner, Moissy Cramayel (FR); Laurent Soulat, Moissy Cramayel (FR); Kevin Morgane Lemarchand, Moissy Cramayel (FR); Tewfik Boudebiza, Moissy Cramayel (FR); Gilles Alain Charier, Moissy Cramayel (FR); Nathalie Nowakowski, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 506 days.

(21) Appl. No.: 15/765,404

(22) PCT Filed: Oct. 5, 2016

(86) PCT No.: PCT/FR2016/052567
§ 371 (c)(1),
(2) Date: Apr. 2, 2018

(87) PCT Pub. No.: WO2017/060628
PCT Pub. Date: Apr. 13, 2017

(65) Prior Publication Data
US 2018/0283272 A1    Oct. 4, 2018

(30) Foreign Application Priority Data

Oct. 5, 2015 (FR) .................................. 1559452
Oct. 5, 2015 (FR) .................................. 1559480
Nov. 16, 2015 (FR) .................................. 1561014

(51) Int. Cl.
*F02C 3/10* (2006.01)
*B64D 27/12* (2006.01)
(Continued)

(52) U.S. Cl.
CPC ............... *F02C 3/10* (2013.01); *B64D 27/12* (2013.01); *B64D 27/18* (2013.01); *B64D 27/26* (2013.01);
(Continued)

(58) Field of Classification Search
CPC ........... F02C 3/10; B64D 27/12; B64D 27/18; B64D 27/26; B64D 35/04
See application file for complete search history.

(56) References Cited

U.S. PATENT DOCUMENTS

| 3,054,577 A * | 9/1962 | Wolf | F02K 3/062 60/226.1 |
|---|---|---|---|
| 3,442,082 A * | 5/1969 | Peterson | F02K 3/12 60/224 |
| 2013/0223991 A1 | 8/2013 | Suciu et al. | |

FOREIGN PATENT DOCUMENTS

GB    2400411 A    10/2004

OTHER PUBLICATIONS

Written Opinion of the International Searching Authority dated Jan. 31, 2017, issued in corresponding International Application No. PCT/FR2016/052567, filed Oct. 5, 2016, 7 pages.
(Continued)

*Primary Examiner* — Justin M Benedik
(74) *Attorney, Agent, or Firm* — Christensen O'Connor Johnson Kindness PLLC (57) ABSTRACT

An aircraft propulsion assembly comprising at least a main turbine mounted along a longitudinal axis, at least one main
(Continued)

fan arranged upstream of the main turbine along the longitudinal axis and driven in rotation by the said main turbine, the said main fan being ducted by a main fan casing, an auxiliary turbine mounted along the longitudinal axis, the auxiliary turbine being independent of the main turbine, an auxiliary fan of axis offset with respect to the longitudinal axis and driven by the auxiliary turbine, the auxiliary fan being ducted by an auxiliary fan casing, the main casing being separate and distinct from the auxiliary casing so as respectively to generate a main secondary flow and an auxiliary secondary flow which remain independent of one another until they are discharged into the atmosphere.

12 Claims, 8 Drawing Sheets (51) Int. Cl.

| | | |
|---|---|---|
| *B64D 35/04* | (2006.01) | |
| *F02K 3/062* | (2006.01) | |
| *F01D 15/12* | (2006.01) | |
| *F02C 3/107* | (2006.01) | |
| *F02C 7/36* | (2006.01) | |
| *F02K 3/06* | (2006.01) | |
| *B64D 27/18* | (2006.01) | |
| *B64D 27/26* | (2006.01) | |

(52) U.S. Cl.
CPC ............. *B64D 35/04* (2013.01); *F01D 15/12* (2013.01); *F02C 3/107* (2013.01); *F02C 7/36* (2013.01); *F02K 3/06* (2013.01); *F02K 3/062* (2013.01); *B64D 2027/266* (2013.01); *F05D 2220/323* (2013.01); *F05D 2220/36* (2013.01); *F05D 2240/14* (2013.01); *F05D 2240/40* (2013.01); *F05D 2240/60* (2013.01); *F05D 2250/312* (2013.01); *F05D 2260/40311* (2013.01)

(56) References Cited

OTHER PUBLICATIONS

International Preliminary Report on Patentability dated Apr. 10, 2018, issued in corresponding International Application No. PCT/FR2016/052567, filed Oct. 5, 2016, 1 page.
International Search Report dated Jan. 31, 2017, issued in corresponding International Application No. PCT/FR2016/052567, filed Oct. 5, 2016, 2 pages.
Written Opinion of the International Searching Authority dated Jan. 31, 2017, issued in corresponding International Application No. PCT/FR2016/052567, filed Oct. 5, 2016, 5 pages.

\* cited by examiner

AIRCRAFT PROPULSION ASSEMBLY EQUIPPED WITH A MAIN FAN AND WITH AT LEAST ONE OFFSET FAN

FIELD OF THE INVENTION

The present invention concerns the aeronautical field and relates to a propulsion assembly comprising at least two fans which are driven by the same gas generator. It aims, in particular, to provide one fan positioned along the gas generator and at least one fan which is offset with respect to the axis of the gas generator.

PRIOR ART

The present applicant has undertaken work on a propulsion assembly architecture having at least two distributed fans. The objectives of these are to optimise propulsive efficiency by means of a high bypass ratio, i.e. the ratio of the secondary flow passing through the fan(s) to the primary air flow passing through the central body with the combustion chamber and turbines, while at the same time maintaining an acceptable ground clearance and reduced-size fans having a speed which is different from that of the turbine. An example of a propulsion assembly having offset fans is known from documents EP 2 574 546 and GB 2 400 411.

In the case of conventional turbojets having a turbine connected directly to the fan, the bypass ratios are limited by the peripheral speed at the head of the fan blades. Architectures for fans driven by means of a speed reduction unit—or UHBR (ultra-high bypass ratio)—partially address this problem by optimising the efficiency of the turbine at a moderate fan speed.

Figure 1:
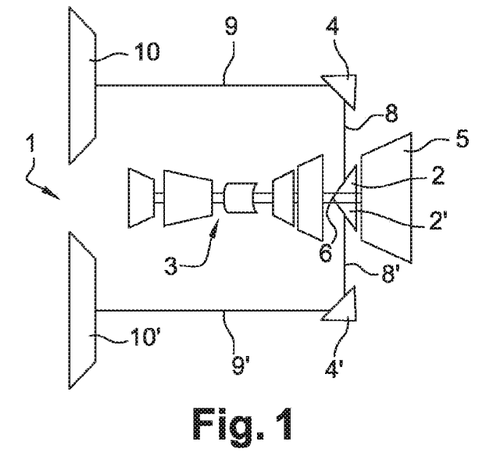
FIG. 1 is a schematic depiction of an architecture of the aircraft propulsion assembly according to prior art.

One of the solutions for continuing to increase the bypass ratio without compromising the rules established in terms of integration is to distribute propulsion across several smaller fan modules. A schematic diagram of such an assembly 1 is shown in FIG. 1. A gas generator 3 conventionally comprises a compression assembly supplying air to an annular combustion chamber; the gases coming from the chamber drive one or more turbines which are mechanically connected to the compressor and here a power turbine 5. The latter is formed integrally with a power shaft 6 which is coaxial with the gas generator 3. This power shaft 6 drives, by means of a suitable transmission system, two intermediate radial shafts each driving an offset fan shaft 9, 9', i.e. having an axis which is offset with respect to the axis of the gas generator. The shafts of the fans 9 and 9' each drive a fan 10, 10' having an axis which is offset with respect to the axis of the motor. Such an arrangement makes it possible to achieve the objectives referred to above.

However, implementing this type of transmission system is complex. The jet of the gas generator directly "shears" the air at an ambient temperature and generates a loud noise which is typical of fighter aircraft with a low bypass ratio or single flow. In addition to this, the gas generator is highly exposed to the ingestion of foreign bodies, which is not the case for a conventional architecture where it is protected by a fan.

The object of the present invention is to overcome this problem.

In particular, the object thereof is to provide an arrangement which makes it possible to maintain a known architecture while at the same time increasing the bypass ratio.

DISCLOSURE OF THE INVENTION

This object is solved by a propulsion assembly of an aircraft comprising:

at least one main turbine mounted along a longitudinal axis;
at least one main fan positioned upstream of the main turbine along the longitudinal axis and rotatably driven by said main turbine, wherein said main fan is streamlined by a main fan casing;
at least one auxiliary turbine mounted along the longitudinal axis, wherein the auxiliary turbine is independent of the main turbine; and
at least one auxiliary fan having an offset axis with respect to the longitudinal axis and being driven by the auxiliary turbine, the auxiliary fan being streamlined by an auxiliary fan casing, wherein the main casing is separate and distinct from the auxiliary casing in such a way as to generate a main secondary flow and an independent auxiliary secondary flow respectively until they are discharged into the atmosphere.

This configuration therefore makes it possible to simplify the design of a propulsion assembly while maintaining a known architecture onto which at least one additional fan module is integrated. In particular, by having a turbine dedicated to each fan and independent fan flows, the aerodynamic efficiency of each turbine and each fan is optimised in an independent manner, which results in better overall efficiency for the propulsion assembly.

The assembly according to the invention may comprise one or more of the following features, taken in isolation from one another or in combination with one another:

the propulsion assembly comprises at least one turbomachine and a propeller.
the propeller comprises the auxiliary fan.
the main fan and the gas generator form a turbomachine.
the auxiliary turbine comprises a free power turbine which is driven by the gas generator and rotatably drives the auxiliary fan.
the propulsion assembly comprises two auxiliary fans which are driven by the auxiliary turbine.
the auxiliary fans are driven by an auxiliary turbine respectively.
the propulsion assembly comprises a first power transmission system which is connected to the auxiliary fan and a second power transmission system which is connected to the first power transmission system, wherein the second power transmission system is arranged:
  downstream of the auxiliary turbine between the auxiliary turbine and the auxiliary fan, or
  upstream of the auxiliary turbine between the auxiliary fan and the main fan.
the first and/or second power transmission system(s) comprise(s) a differential gear system.
the differential gear system comprising a casing, an input axial shaft, a planet carrier driven by the input shaft, planet pinions mounted on the planet carrier, at least one angle gear supported by the casing and radial shafts which are each perpendicular to the input axial shaft, the radial shafts being formed integrally with the planet wheels, the planet carrier and the input shaft being coaxial and the planet carrier forming a hub on which the axes of rotation of the planet gears are positioned radially.
the first and/or second power transmission system(s) comprises a speed reduction unit.
the speed reduction unit is an epicyclical gear mechanism.
the first and/or second power transmission system(s) comprise(s) two constant velocity joints in series with a slide link.

the first and/or second power transmission system(s) is located in an area of the motor which is not thermally stressed, in particular upstream of the gas generator.

the first and/or second power transmission system(s) is/are located downstream of the turbine.

the turbomachine is fixed under the wing and the auxiliary fan is fixed on the wing, the axis of the turbomachine and the fan being located in the same vertical plane.

the turbomachine is a multi-flow turbojet or a turboprop.

the turbomachine and the auxiliary fan are mounted on the wing by means of a pylon.

the turbomachine is fixed under the wing.

the auxiliary fan is fixed on the wing.

the turbomachine and/or the auxiliary fan is/are equipped with thrust reversal means.

at least the turbomachine or the auxiliary fan which is mounted on the wing comprises thrust reversal means which are able to deflect the air flow which passes through it at least upwards and/or laterally.

at least the auxiliary fan or the turbomachine which is fixed under the wing comprises thrust reversal means which are able to deflect the air flow which passes through it at least laterally in part.

The invention also relates to a propulsion assembly of an aircraft comprising:

at least one main turbine mounted along a longitudinal axis;

at least one main fan positioned along the longitudinal axis and rotatably driven by said main turbine;

at least one auxiliary turbine mounted along the longitudinal axis, wherein the auxiliary turbine is independent of the main turbine; and at least one auxiliary fan having an offset axis with respect to the longitudinal axis and being driven by the auxiliary turbine.

The invention also relates to a propulsion assembly of an aircraft comprising:

at least one turbine mounted along a longitudinal axis;

at least one main fan positioned along the longitudinal axis and rotatably driven by said turbine;

at least one auxiliary turbine mounted along the longitudinal axis;

at least one auxiliary fan having an offset axis with respect to the longitudinal axis and being driven by the auxiliary turbine, wherein the auxiliary fan is connected to a first power transmission system; and a second power transmission system connected to the first power transmission system, wherein the second power transmission system is arranged:

downstream of the auxiliary turbine between the auxiliary turbine and the auxiliary fan, or upstream of the auxiliary turbine between the auxiliary fan and the main fan.

When the second power transmission system is arranged downstream of the drive turbine of the main fan, and when the main and auxiliary fan(s) are driven by different and independent turbines, they are discharged together. When this second power transmission system is arranged upstream of the gas generator, it facilitates its integration because it is an area where the thermal-related stresses (operating temperature, expansion of parts etc.) are much lower.

The invention also relates to an aircraft comprising a fuselage, two wings, on either side of the fuselage, at least two propulsion assemblies, each fixed to one of the wings, wherein the propulsion assemblies comprise at least one turbomotor and a propeller, one of the two being fixed under the wing, the other fixed on the wing, in particular the axes of the turbomotor and the propeller being located in the same vertical plane.

The invention also relates to an aircraft comprising:

an aerofoil comprising a first upstream longeron and a second downstream longeron extending in a wingspan direction of said aerofoil; and, at least one propulsion assembly supported by the aerofoil, the propulsion assembly comprising a turbomotor and a propeller, wherein the propeller comprises an outer annular casing fixed at least to the first upstream longeron via at least a first and a second fastener.

DESCRIPTION OF THE FIGURES

Other features and advantages will emerge from the following description of embodiments of the invention in a non-limiting manner with reference to the appended drawings in which.

DETAILED DESCRIPTION OF AN EMBODIMENT OF THE INVENTION

Figure 2:
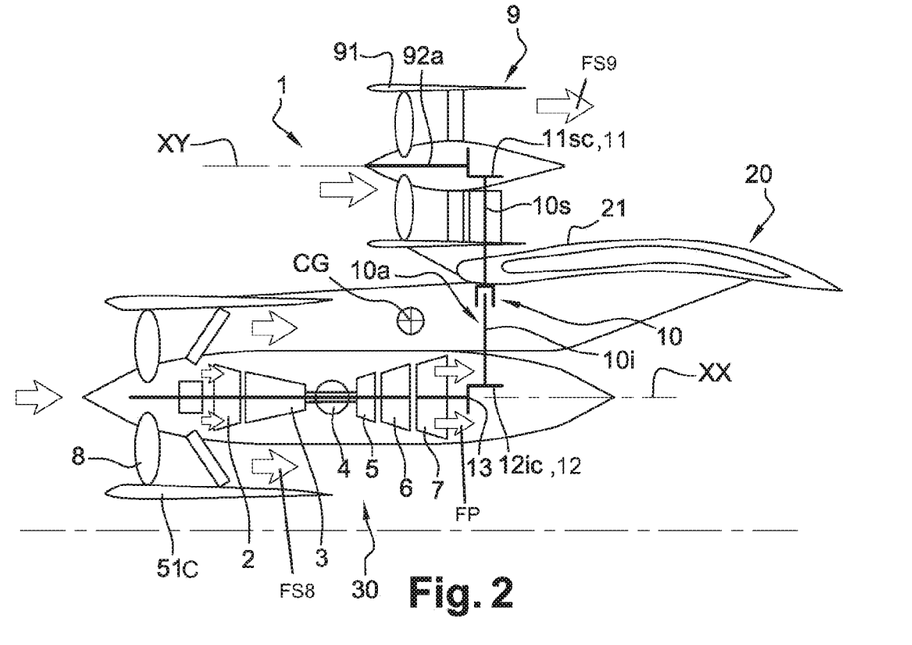
FIG. 2 schematically shows a first embodiment of the arrangement of an auxiliary fan module driven by an auxiliary turbine.

FIG. 2 shows a propulsion assembly 1 of an aircraft according to a first embodiment. In this example, the propulsion assembly 1 is shown mounted on the aerofoil 20 or wing of an aircraft. The aircraft comprises at least two of such propulsion assemblies, one on each wing 20. This propulsion assembly 1 comprises in this case a turbojet 40 comprising a gas generator 30 with a longitudinal axis XX. The invention can of course be applied to other types of turbomachines. The gas generator 30, following the longitudinal axis XX from upstream to downstream, a low-pressure (LP) compressor 2, a high-pressure (HP) compressor 3, a combustion chamber 4, a high-pressure (HP) turbine 5 and a low-pressure (LP) turbine 6. In the present invention, and generally speaking, the terms "upstream" and "downstream" are defined with respect to the flow of gas in the propulsion assembly or with respect to the direction of movement of the aircraft during flight. The LP compressor and the LP turbine are connected by an LP shaft to form a low-pressure body. The HP compressor and the HP turbine are mechanically connected by a high-pressure shaft to form a high-pressure body. The HP and LP bodies form the gas generator 30 which, in this case, is a twin-spool gas turbine engine. The LP and HP bodies are coaxial and are rotatably mounted in an independent manner. The combustion chamber 4 is supplied with compressed air coming from compressors 2 and 3 in series. The gases produced in the combustion chamber 4 successively move the HP turbine 5 and LP turbine 6 which respectively drive the two compressors, HP 2 and LP 3.

The turbojet 40 comprises a "main" fan 8 upstream of the gas generator 30. The main fan 8 is streamlined by a main fan casing 51C illustrated more precisely in FIG. 2. The LP turbine 6, also known as the main turbine here, drives the streamlined main fan 8. The main fan 8 comprises a rotor which is supported by the shaft of the LP turbine with blades at the periphery of the rotor.

The main fan 8 compresses the air entering the propulsion assembly 1 which is divided into a primary flow circulating through a primary channel which passes through the gas generator 30 and a main secondary flow circulating through a secondary channel around the gas generator 30. The secondary channel is formed by the casing 51C and a casing housing the gas generator 30.

The secondary channel downstream of the main fan 8 is short according to this embodiment. The secondary flow FS8 of the main fan and the primary flow FP, the latter forming the gases produced by the combustion chamber, are separated; the two flows are discharged into the atmosphere through distinct, concentric exhaust nozzles which are not shown. The turbojet 40 could, however, be a mixed-flow turbojet, the two flows being mixed upstream of the gas exhaust nozzle.

A free power turbine 7, also known as the auxiliary turbine, is also mounted downstream of the LP turbine 6. The free power turbine 7 is rotatably driven by the primary flow gases of the gas generator 30 independently of the LP and HP bodies. This free power turbine 7 is formed integrally with a power shaft 13 which is coaxial with the longitudinal axis XX and rotatably drives it.

The propulsion assembly 1 comprises a propeller according to the invention. According to the embodiment shown, this is another "auxiliary" fan 9 which is mounted along an axis XY which is offset with respect to the longitudinal axis XX. The term "offset" means that the axes XX and XY are not coaxial. The auxiliary fan 9 has an auxiliary fan casing 91, as can be seen in FIG. 2. In the present embodiment, the axis XY of the auxiliary fan 9 is parallel to the axis of the gas generator 30. The auxiliary turbine, in this case the free power turbine with reference to FIG. 2, drives the streamlined auxiliary fan 9. This auxiliary fan 9 generates an "auxiliary" secondary flow FS9 which circulates through the casing 91 as shown by the arrows in FIG. 2. This auxiliary secondary flow FS9 is discharged into the atmosphere through an exhaust nozzle downstream of the casing 91. The casing 91 of the auxiliary fan 9 is independent of and distinct from the casing 51C of the auxiliary fan casing. As such, we understand that the main and auxiliary secondary flows FS8, FS9 are independent until they are discharged into the atmosphere. This makes it possible to optimise the aerodynamic efficiency of each turbine and each fan independently. The overall efficiency of the propulsion assembly is thus improved.

In particular, the rotor of the fan is rotatably driven by an intermediate shaft 10. This is composed of two parts in this example; a lower part 10$i$ and an upper part 10$s$. The two parts are connected to each other by means of a suitable coupling 10$a$. This coupling enables the easy dismantling of the two parts of the intermediate shaft. It also makes it possible to ensure the transmission of movement in the event of non-alignment resulting from deformations in the structure which are likely to occur during flight. The rotor can of course be driven by a one-piece intermediate shaft 10.

The upper part 10$s$ of the intermediate shaft 10 is rotatably driven via the output shaft 13 of the free power turbine 7 by means of a first power transmission system 11. Advantageously, but in a non-limiting manner, this first power transmission system 11 comprises a conical counter-gear 11$sc$ which meshes with the drive shaft 92$a$ of the fan 9. At the other end, the lower part 10$i$ cooperates with a second power transmission system 12. Advantageously, but in a non-limiting manner, the second power transmission system 12 comprises a conical gear 12$ic$ which meshes with the shaft 13 of the free power turbine. The lower part 10$i$ of the intermediate shaft 10 is rotatably driven by the shaft 13. The meshing of bevel gears makes it possible to simplify the integration of the different modules. The angular gearbox inside the auxiliary fan enables speed transformations between input shafts and output shafts with a gear ratio of between 0.5 and 1.5.

The turbomachine formed by the turbojet 40 provides part of the thrust on the aircraft by means of the entire primary and secondary flow that is produced. The main secondary flow FS8 is generated by the main fan 8 and the auxiliary secondary flow FS9 is generated by the auxiliary fan 9. It is understood that the flow from all the fans, main and auxiliary, form the secondary flow. The bypass ratio is, in this case, the ratio of the secondary flow (main secondary flow and auxiliary secondary flow) passing through the fans to the primary flow passing through the gas generator. The free power turbine 7 rotatably drives the rotor of the fan 9 via the intermediate shaft 10 and the first and second power transmission systems 11, 12.

This propulsion assembly 1 is shown mounted on the aerofoil 20 of an aircraft with the auxiliary fan 9 above the wing 20 and the main fan 8 below the wing 20. The assembly comprises a turbojet which is suspended on a pylon under the wing towards the front with respect to the leading edge of the wing. The auxiliary fan 9 is of course mounted on the wing by means of a pylon 21 or any other equivalent structure forming a support for the fan on the wing 20. The auxiliary fan 9 may stand out above the wing or may be flush with the wing depending on the desired aerodynamic conditions. According to this depiction, the plane of rotation of the auxiliary fan 9 is upstream of the leading edge of the wing 20.

With respect to a prior art arrangement where the offset auxiliary fan is to be at the same axial level as the main fan 8 of the turbojet 40, the centre of gravity CG of the propulsion assembly is offset downstream because the offset auxiliary fan 9 is downstream with respect to the main fan 8. This positioning is favourable in terms of flight stability.

The axes of the turbojet 40 and the auxiliary fan 9 are advantageously in the same vertical plane which is favourable in terms of stability during flight because the thrust forces are in the same vertical plane. It is thereby noted that the bypass ratio is increased with respect to that of the turbojet but without the ground clearance being affected.

Figure 11:
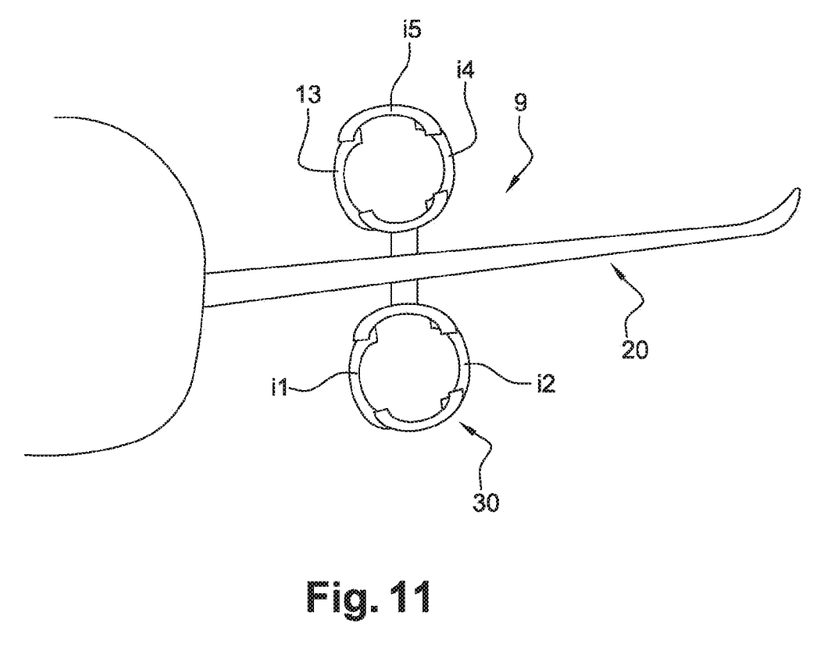
FIG. 11 shows an installation diagram of the propulsion assembly of FIG. 2, viewed from the front.

Another advantage of the solution is that the propulsion assembly comprises thrust reversal means. These thrust reversal means comprise thrust reverser doors as shown in FIG. 11. The thrust reverser doors are, in this case, arranged in five sectors on the turbojet without there being any risk of the reverse flows interfering with a surface of the aircraft. In FIG. 11, in i1 or i2, the two sectors are lateral and make it possible to generate reverse flows which do not interfere with the fuselage, the wing 20 or the ground.

It is still possible to arrange the thrust reverser doors on the auxiliary fan 9. With reference to FIG. 11, three orientations are possible here: two lateral, i3 and i4, and one upwards, i5.

According to an alternative embodiment which is not shown, the first power transmission system 11 further comprises a link comprising first and second constant velocity joints which are finger ball-type joints connected by a slide link. The first joint is connected to the intermediate shaft while the second joint is connected to the fan rotor. This combination makes it possible to make up for the angular displacements between the axial and radial displacements of the intermediate shaft.

Advantageously, but in a non-limiting manner, the joint(s) may be a Rzeppa joint. Such a joint comprises a drive shaft and a driven shaft; a bowl is formed integrally with one axis and a nut is formed integrally with the other axis with balls interposed. These elements are arranged in such a way as to allow the driven shaft to be driven at the same speed of rotation as the input shaft while at the same time acknowledging an angular misalignment between them.

Advantageously, but in a non-limiting manner, the joint(s) may be a known sliding VL joint. This joint comprises a drive shaft and a driven shaft. Balls retained in a cage can be moved within outer and inner crossed grooves respectively. The grooves enable axial displacement of one axis with respect to the other while at the same time ensuring torque transmission. The second joint may also be a Rzeppa joint. The connection between the two joints is therefore a sliding connection, for example by means of sliding splines.

According to an alternative embodiment, the connecting shaft between the main fan and the auxiliary fan module may be inclined at an angle of between −45° and +45° with respect to the axes of the drive and driven members. This configuration makes it possible to vary the axial position of the auxiliary fan module with respect to the main fan and the gas generator.

According to yet another alternative embodiment, the first power transmission system 11 may comprise a differential gear system.

According to yet another alternative embodiment of the invention, the first power transmission system 11 may comprise a speed reduction unit. In particular, the auxiliary fan 9 is driven by its fan shaft which in turn is driven by means of a speed reduction unit which is supported by the shaft 10. The reduction unit preferably has an epicyclical gear train having a side gear, a ring gear and planet gears. The planet gears are supported by a fixed frame, attached to the casing of the propulsion assembly. The wheels forming the planet gears mesh, on the one hand on the teeth of the planet wheel and, on the other hand on the teeth of the ring gear. The side gear meshes with the set of planet gears, the number of which depends on the size of the reduction unit, the reduction ratio and the input torque.

According to one embodiment, these planet gears have double herringbone helical toothing. In this case, the translational degree of freedom on the axis of the fan between the various components of the reduction unit is blocked. The axial translational degree of freedom between each component is restored, such that significant internal stresses are not experienced during the axial expansion of the environment under thermal load. For example, it is possible for this purpose to use planet gear guidance by sliding bearings without an axial stop and a fan rotor/ring gear connection made with the aid of a spline which is not axially blocked and therefore slides on the axis of the fan.

These planet gears are spur gears according to another embodiment. The axial translational degree of freedom is maintained between the side gear/planet gears and planet gears/ring gear. In this case, it is not necessary to use sliding splines and it is possible to favour, for example, the use of spherical roller bearings to guide the planet gears.

The shaft element of the fan 9 is engaged, at the input of the reduction unit, with the side gear and, at the output, the fan shaft is driven by the ring gear with which it is formed integrally. The shafts positioned along the axis XY, supported by sets of ball or roller bearings with the fixed structure of the propulsion assembly, are in this case coaxial in the direction XY which is parallel and offset with respect to the direction XY of the shaft 13.

The reduction unit may be a planar or spherical reduction unit.

It is understood that these alternative embodiments of the first power transmission system 11 can be applied to the second power transmission system 12.

Figure 3:
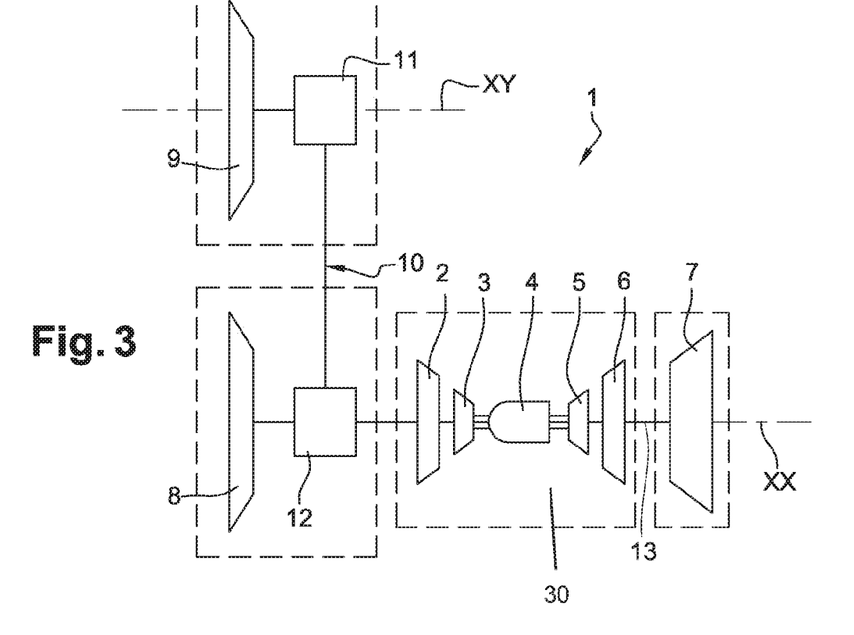
FIG. 3 schematically shows a second embodiment of the arrangement of an auxiliary fan module in a standard architecture.

FIG. 3 illustrates another embodiment of a propulsion assembly. The elements which are identical to those in FIG. 2 are designated by the same reference numerals. The propulsion assembly comprises a gas generator 30. The latter comprises an LP body and an HP body which are rotatably mounted independently along the longitudinal axis XX. The LP body comprises an LP compressor and an LP turbine which are connected by a low-pressure shaft. An HP compressor and an HP turbine are arranged between these, forming the HP body. This is a twin-spool gas turbine engine. In this example, a main fan 8 is mounted upstream of the LP compressor 2, namely the gas generator, along the axis XX. An auxiliary fan 9 is also positioned along an axis XY which is offset with respect to the longitudinal axis XX. The auxiliary fan 9 is driven by the power shaft of the free power turbine 7 via a first power transmission system 11 which is positioned between the main fan and the auxiliary fan 9. The first power transmission system 11 and the auxiliary fan 9 form a fan module.

The main fan 8 is also driven by the turbine 6 by means of a second power transmission system 12.

The first power transmission system 11 and the second power transmission system 12 are similar to those presented in the first embodiment illustrated in FIG. 1. The first and second transmission systems 11, 12 make it possible to make an angular gearbox and possibly reduce the speed or achieve a torque distribution across several outputs. These first and second power transmission systems are arranged upstream of a plane which is perpendicular to the axis XX and upstream of the gas generator. The auxiliary fan is positioned upstream of this plane as well. The air inputs of the main and auxiliary fans are arranged substantially in the same plane perpendicular to the axis XX.

Figure 4:
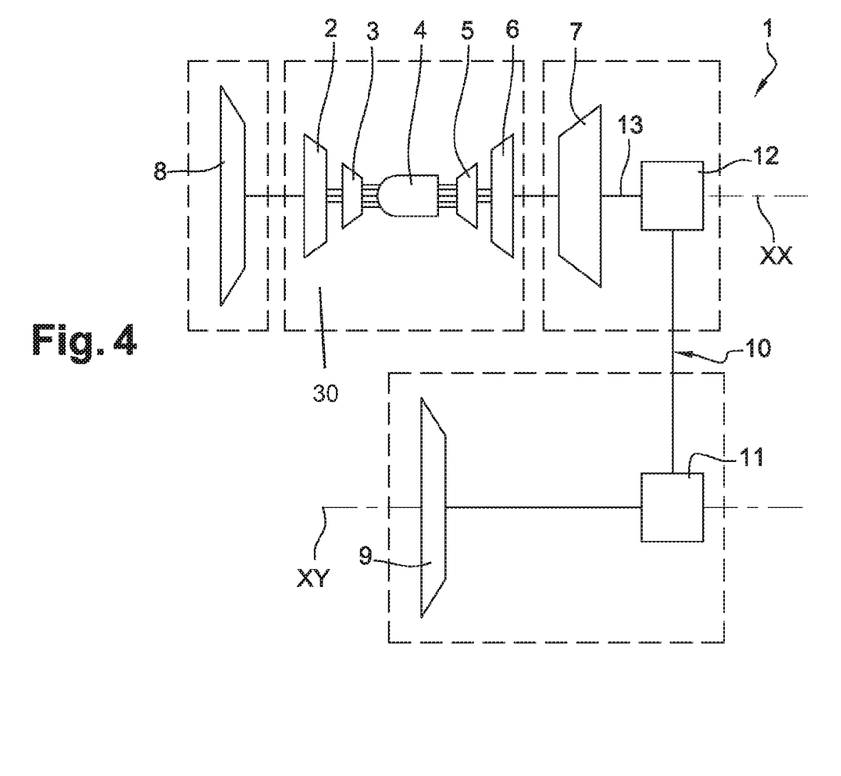
FIG. 4 shows a schematic depiction of a variant of the first embodiment according to FIG. 3.

According to a variant of the previous embodiment illustrated in FIG. 4, the main fan 8 is positioned upstream of the gas generator 30. The second power transmission system 12 is positioned downstream of the free power turbine 7 and is connected to the auxiliary fan 9 which is offset along the axis XY with respect to the longitudinal axis XX. The second power transmission system 12 is mechanically connected to the first power transmission system 11. These first and second power transmission systems are arranged downstream of a plane which is perpendicular to the axis XX and downstream of the gas generator 30, in particular of the free power turbine 7. The air inputs of the main and auxiliary fans are axially offset.

Figure 5:
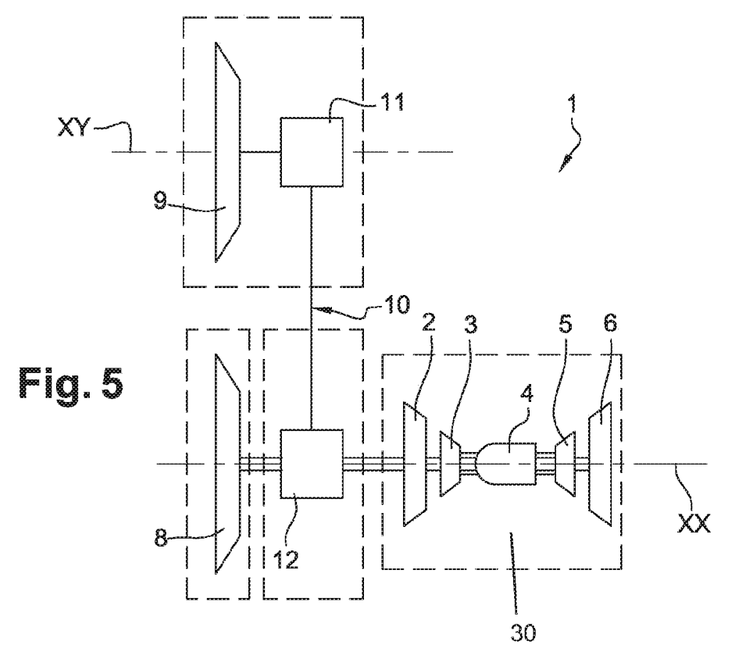
FIG. 5 shows a schematic depiction of the arrangement of the auxiliary fan module according to another embodiment of the invention.

FIG. 5 shows another embodiment of a propulsion assembly. In this figure, elements which are identical to those in FIGS. 1 and 2 are designated by the same reference numerals. The propulsion assembly comprises an LP body and an HP body which are rotatably mounted independently along the longitudinal axis XX. The LP body comprises an LP compressor 2 and an LP turbine 6 which are connected by a low-pressure shaft. An HP compressor 3 and an HP turbine 5 are arranged between these, forming the HP body. The HP and LP bodies form the gas generator 30. This is a twin-spool gas turbine engine. A main fan 8 is arranged upstream of the gas generator, said main fan 8 comprising a fan rotor which is formed integrally with the LP shaft of the LP compressor 2. The main fan 8 and the LP compressor 2 are rotatably driven by the LP turbine 6, also known as the main turbine.

An auxiliary fan 9 is also positioned along an axis XY which is offset with respect to the longitudinal axis XX of the gas generator. The auxiliary fan 9 is driven by the LP shaft of the LP turbine via the first transmission system 11. The second power transmission system 12 is arranged between the LP compressor 2 and the main fan rotor 8. The intermediate shaft 10 mechanically connects the first power transmission system 11 and the second power transmission system 12.

The first and/or second power transmission system(s) is/are similar to the one/those presented in the first embodiment. The first and second transmission systems 11, 12 make it possible to make an angular gearbox and possibly reduce the speed or achieve a torque distribution across several outputs. These first and second power transmission systems are arranged upstream of a plane which is perpendicular to the axis XX and upstream of the gas generator. The auxiliary fan is positioned upstream of this plane as well. The air inputs of the main and auxiliary fans are arranged substantially in the same plane perpendicular to the axis XX.

Figure 6:
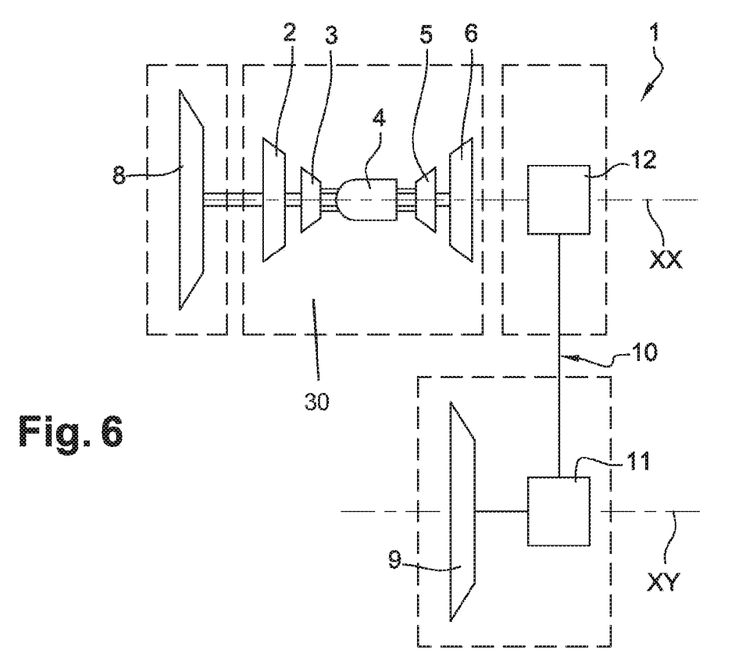
FIG. 6 schematically illustrates an alternative embodiment according to FIG. 5.

According to a variant of this previous embodiment illustrated in FIG. 6, the main fan rotor 8 is positioned upstream of the gas generator 30, in particular of the LP compressor 2. The fan rotor 8 is formed integrally with the shaft of the LP compressor 2 and is driven directly by the LP turbine. An auxiliary fan 9 is positioned along an axis XY which is offset with respect to the longitudinal axis XX of the gas generator 30. The second power transmission system 12 is arranged downstream of the LP turbine. This is mechanically connected to the first power transmission system 11 via the intermediate shaft 10. More specifically, the first and second power transmission systems are arranged downstream of a plane which is perpendicular to the axis XX and downstream of the gas generator 30, in particular, of the free power turbine 7. The air inputs of the main and auxiliary fans are axially offset.

Figure 7:
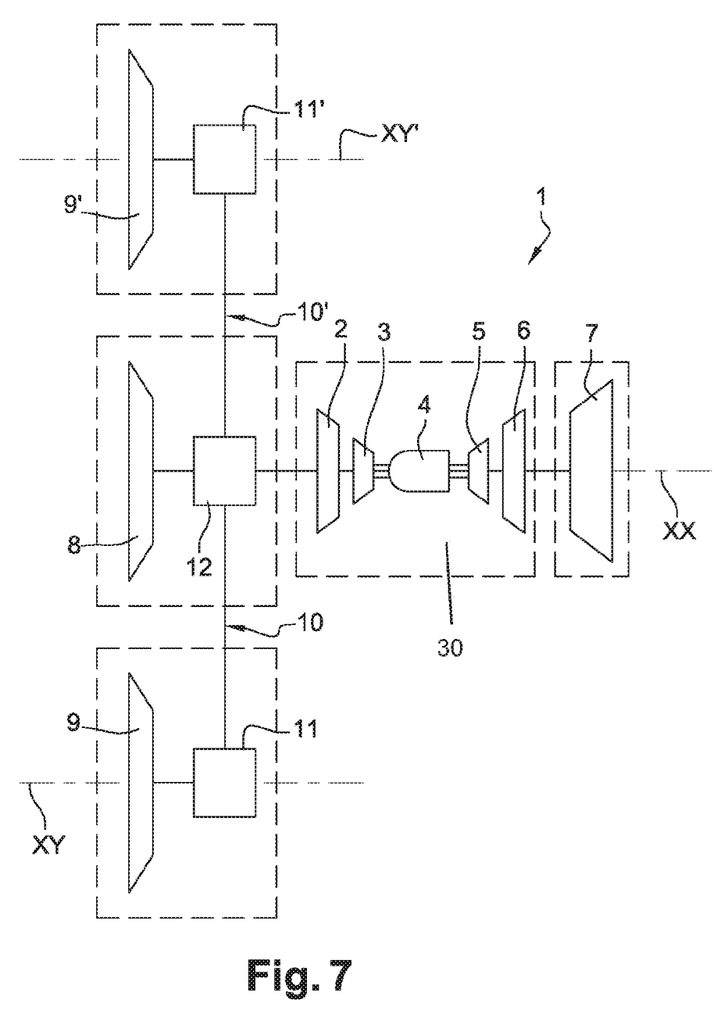
FIG. 7 illustrates, in a schematic depiction, another embodiment in which two auxiliary fan modules are arranged offset with respect to a gas generator, upstream of which a main fan is installed.

According to another embodiment illustrated in FIG. 7, the propulsion assembly 1 comprises an HP body and an LP body forming the gas generator 30 along the longitudinal axis XX. A free power turbine 7 is also positioned along the axis XX and downstream of the LP turbine. The free power turbine 7 is rotatably driven by the gases of the gas generator independently of the LP and HP bodies. Three fans are positioned upstream of the compressor of the gas generator. In particular, the propulsion assembly 1 comprises a main fan 8 which is mounted upstream of the gas generator and driven by the turbine 6 along the axis XX. Two auxiliary fans 9, 9' are each arranged on either side of the main fan 8. The auxiliary fans 9, 9' are respectively mounted along an axis XY and XY' which is offset with respect to the longitudinal axis XX. The air inputs of the main and auxiliary fans are arranged substantially in the same plane perpendicular to the axis XX. The auxiliary fans 9, 9' are rotatably driven by the free power turbine 7. Each auxiliary fan rotor 9, 9' is mechanically connected to a first power transmission system 11, 11'. The main fan rotor 8 is mechanically connected to the second power transmission system 12 positioned upstream of the LP compressor 2. The first and second radial intermediate shafts respectively connect the first power transmission systems 11, 11' to the second power transmission system 12.

The first and/or second power transmission systems are similar to those presented in the first embodiment. The first and second transmission systems 11, 12 make it possible to make an angular gearbox and possibly reduce the speed or achieve a torque distribution across several outputs. The first and second power transmission systems are arranged upstream of a plane which is perpendicular to the axis XX and upstream of the gas generator. The auxiliary fans are positioned upstream of this plane as well.

Figure 8:
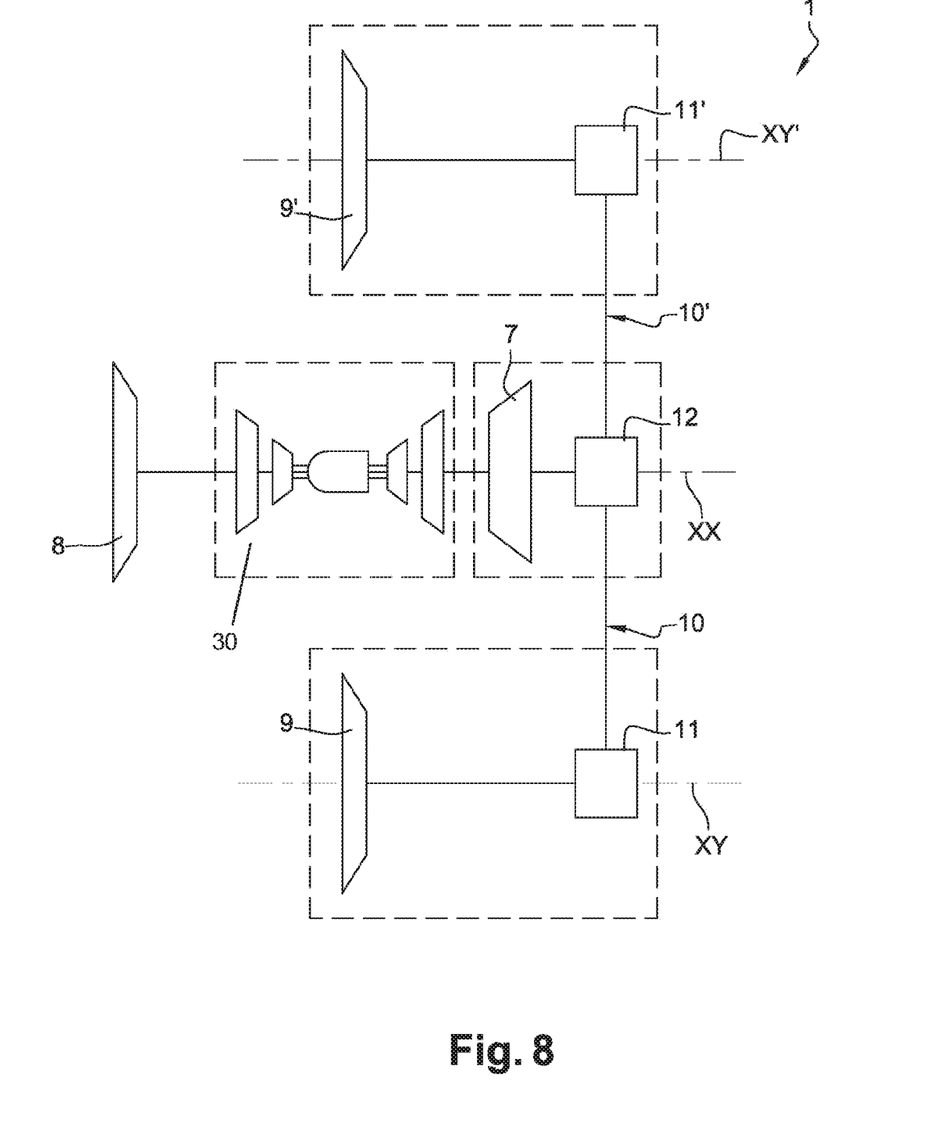
FIG. 8 schematically illustrates an alternative embodiment according to FIG. 7.

According to a variant of the previous embodiment illustrated in FIG. 8, the propulsion assembly also comprises three fans. The main fan is arranged upstream of the gas generator and is rotatably driven by the turbine 6 along the longitudinal axis XX. The two auxiliary fans 9, 9' are respectively mounted along the axes XY, XY' which are offset with respect to the axis XX. Here, the air inputs of the main and auxiliary fans are axially offset. The air inputs of the auxiliary fans are substantially in the same plane. The second power transmission system 12 is arranged downstream of the free power turbine 7. The auxiliary fans 9, 9' are driven by the power shaft of the free power turbine 7 via the first power transmission systems 11, 11'. The first power transmission systems 11, 11' of the offset auxiliary fans 9, 9' are mechanically connected to the second power transmission system 12 via intermediate shafts 10, 10'. The first and second power transmission systems are arranged downstream of a plane which is perpendicular to the axis XX and downstream of the gas generator 30, in particular of the free power turbine 7.

Figure 9:
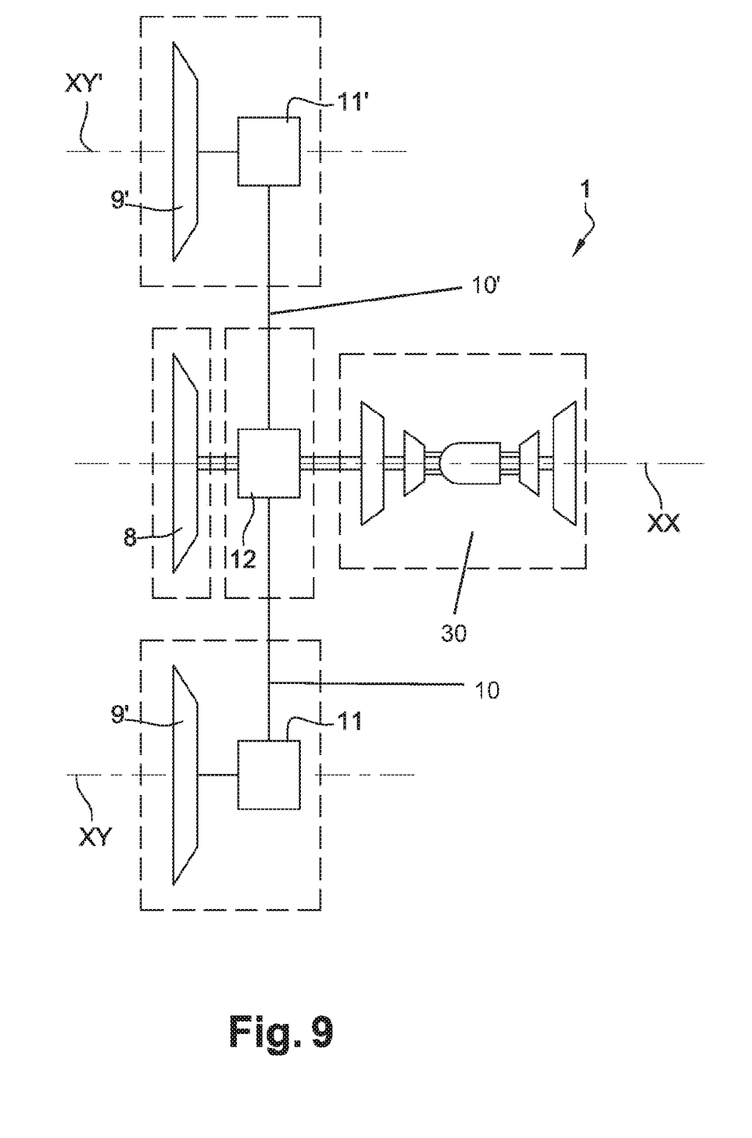
FIG. 9 is a schematic view of another embodiment of the invention in which two fan modules are offset with respect to the axis of a twin-spool gas generator, upstream of which a main fan is installed.

FIG. 9 shows another embodiment of a propulsion assembly. Here, the assembly comprises an HP body and an LP body forming a gas generator 30. In this example, the LP turbine is an auxiliary turbine with respect to the HP turbine. The main fan rotor 8 is formed integrally with the LP shaft of the LP compressor and is driven by the LP turbine. The second power transmission system 12 is mounted upstream of the LP compressor and is connected to two offset auxiliary fans 9, 9'. In particular, each auxiliary fan 9, 9' is connected to a first power transmission system 11, 11' which in turn are connected to the second power transmission system 12 via intermediate shafts 10, 10'. The auxiliary fans are driven by the LP turbine.

The first and/or second power transmission systems are similar to those presented in the first embodiment. The first and second transmission systems 11, 12 make it possible to make an angular gearbox and possibly reduce the speed or achieve a torque distribution across several outputs. The first and second power transmission systems are arranged upstream of a plane which is perpendicular to the axis XX and upstream of the gas generator. The auxiliary fans are positioned upstream of this plane as well.

Figure 10:
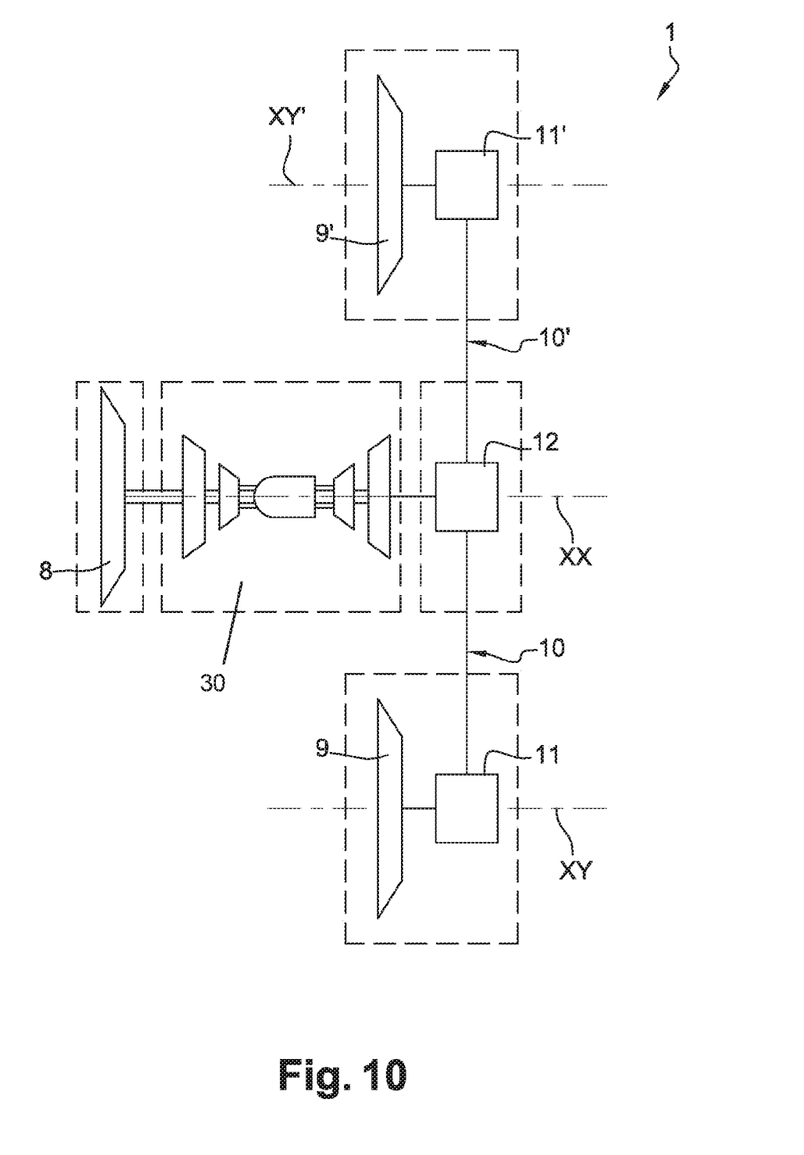
FIG. 10 is a variant of the embodiment illustrated in FIG. 9.

According to a variant of this previous embodiment illustrated in FIG. 10, the main fan rotor is positioned upstream of the gas generator 30. The second power transmission system 12 is arranged downstream of the LP turbine. This is mechanically connected to two auxiliary fans 9, 9' mounted on an axis which is offset with respect to the axis XX of the gas generator 30 via first power transmission system 11, 11'.

These different configurations therefore make it possible to simplify the design of a distributed propulsion assembly while maintaining a known architecture onto which at least one additional fan module is integrated. The exhaust stream of the generator is covered by the exhaust stream of the main fan; the reduced speed delta between the two exhaust streams makes it possible to reduce the shearing effect of the air layers and significantly reduce the perceived jet noise. This configuration also conforms to the current and future aviation noise standards.

The invention is not limited to these embodiments. The turbomachine could be a propellant with a propeller instead of the fan 8 or the fan 9 may be replaced by a propeller.

Alternatively, the turbomachine may be arranged on the wing whereas the fan 9 is under the wing. The elements are the same as those in the embodiment of FIG. 2 but they are reversed with respect to the wing 20.

It is also understood that the auxiliary fan and the main fan may be positioned in a horizontal plane rather than a vertical one.

The invention claimed is:

1. An aircraft propulsion assembly comprising:
   at least one main turbine mounted along a longitudinal axis;
   at least one auxiliary turbine mounted along the longitudinal axis, wherein the auxiliary turbine is independent of the main turbine;
   at least one auxiliary fan having an offset axis with respect to the longitudinal axis and driven by the auxiliary turbine, the auxiliary fan being streamlined by an auxiliary fan casing,
   wherein at least one main fan is positioned upstream of the main turbine along the longitudinal axis and rotatably driven by said main turbine, said main fan being streamlined by a main fan casing,
   wherein the main casing is separate and distinct from the auxiliary casing in such a way as to generate an independent main secondary flow and an independent auxiliary secondary flow respectively until they are discharged into the atmosphere.

2. The assembly according to claim 1, wherein the auxiliary turbine comprises a free power turbine which is driven by a gas generator comprising the main turbine and rotatably driving the auxiliary fan.

3. The assembly according to claim 1, comprising two auxiliary fans which are driven by the auxiliary turbine.

4. The assembly according to claim 1, comprising a first power transmission system which is connected to the auxiliary fan and a second power transmission system which is connected to the first power transmission system, wherein the second power transmission system is arranged:
   downstream of the auxiliary turbine between the auxiliary turbine and the auxiliary fan, or
   upstream of the auxiliary turbine between the auxiliary fan and the main fan.

5. The assembly according to claim 4, wherein the first and/or second power transmission system comprises a differential gear system.

6. The assembly according to claim 4, wherein the first and/or second power transmission system comprises a speed reduction unit, wherein the speed reduction unit is an epicyclical gear mechanism.

7. The assembly according to claim 1, wherein the first and/or second power transmission system comprises two constant velocity joints in series with a slide link.

8. The assembly according to claim 2, wherein the main fan and the gas generator form a turbomachine, the turbomachine being designed to be fixed under an aircraft wing and the auxiliary fan being designed to be fixed on the wing, wherein the axes of the turbomachine and the auxiliary fan are located in the same vertical plane.

9. The assembly according to claim 8, wherein the turbomachine is a multi-flow turbojet or a turboprop.

10. The assembly according to claim 8, wherein the turbomachine and the auxiliary fan are mounted on the wing by means of a pylon.

11. The assembly according to claim 1, comprising a gas generator comprising the main turbine, the main fan driving a primary flow circulating in a primary channel which passes through the gas generator and the main secondary flow in the main fan casing around the gas generator.

12. An aircraft comprising a fuselage, two wings on either side of the fuselage, and at least two propulsion assemblies according to claim 1, each propulsion assembly comprising a turbomachine and a fan, one of the turbomachine and the fan being fixed under the wing and the other being fixed on the wing, wherein the axes of the turbomachine and the axes of the fan are in the same vertical plane.

* * * * *